(12) United States Patent
Govindarajan et al.

(10) Patent No.: US 8,249,590 B2
(45) Date of Patent: Aug. 21, 2012

(54) SYSTEM, METHOD, AND APPARATUS FOR VOICE HANDOFFS

(75) Inventors: Rangaprasad Govindarajan, Plano, TX (US); Anurag Vohra, Ahmedabad (IN); Jogen K Pathak, Irving, TX (US)

(73) Assignee: Varaha Systems Incorporated, Dallas, TX (US)

( * ) Notice: Subject to any disclaimer, the term of this patent is extended or adjusted under 35 U.S.C. 154(b) by 1011 days.

(21) Appl. No.: 11/503,747

(22) Filed: Aug. 14, 2006

(65) Prior Publication Data

US 2007/0042777 A1 Feb. 22, 2007

Related U.S. Application Data

(60) Provisional application No. 60/679,936, filed on Aug. 16, 2005.

(51) Int. Cl.
*H04L 12/56* (2006.01)
*H04L 12/28* (2006.01)

(52) U.S. Cl. ........................... 455/434; 455/437

(58) Field of Classification Search .................. 455/5, 4
See application file for complete search history.

(56) References Cited

U.S. PATENT DOCUMENTS

| | | | | |
|---|---|---|---|---|
| 7,277,704 B2 * | 10/2007 | Cooper | | 455/434 |
| 7,299,009 B2 * | 11/2007 | Hussmann | | 455/41.2 |
| 7,471,946 B2 * | 12/2008 | Adamczyk et al. | | 455/412.1 |
| 7,502,615 B2 * | 3/2009 | Wilhoite et al. | | 455/442 |
| 7,761,087 B2 * | 7/2010 | Kharia et al. | | 455/414.1 |
| 2002/0147008 A1 * | 10/2002 | Kallio | | 455/426 |
| 2004/0121781 A1 * | 6/2004 | Sammarco | | 455/456.1 |
| 2004/0266426 A1 * | 12/2004 | Marsh et al. | | 455/426.2 |
| 2005/0147049 A1 * | 7/2005 | Ganesan | | 370/241 |
| 2005/0208966 A1 * | 9/2005 | David et al. | | 455/553.1 |
| 2006/0025151 A1 * | 2/2006 | Karaoguz et al. | | 455/455 |
| 2006/0026268 A1 * | 2/2006 | Sanda | | 709/221 |
| 2006/0063560 A1 * | 3/2006 | Herle | | 455/552.1 |
| 2006/0126582 A1 * | 6/2006 | Saifullah et al. | | 370/338 |
| 2006/0217147 A1 * | 9/2006 | Olvera-Hernandez et al. | | 455/552.1 |
| 2006/0270421 A1 * | 11/2006 | Phillips et al. | | 455/457 |
| 2007/0015536 A1 * | 1/2007 | LaBauve et al. | | 455/552.1 |
| 2007/0026866 A1 * | 2/2007 | Krishnamurthi et al. | | 455/440 |
| 2007/0082671 A1 * | 4/2007 | Feng et al. | | 455/436 |
| 2007/0082715 A1 * | 4/2007 | Rofougaran et al. | | 455/574 |
| 2008/0058003 A1 * | 3/2008 | Rydnell et al. | | 455/552.1 |
| 2010/0003935 A1 * | 1/2010 | Behzad et al. | | 455/132 |
| 2010/0074228 A1 * | 3/2010 | Hicks et al. | | 370/332 |

\* cited by examiner

*Primary Examiner* — Rafael Pérez-Gutiérrez
*Assistant Examiner* — Frank Donado
(74) *Attorney, Agent, or Firm* — Baker Botts L.L.P.

(57) ABSTRACT

A power management system is described where the handset can enter sleep or hibernation mode for a particular service, when the particular service is either not used or not available. The handset is capable of using the service, even in response to a non-user initiated incoming request for communication. The handset receives the request over the active service. The handset can then check for the availability of the inactive service, activate it, and a selection can be made between them.

18 Claims, 8 Drawing Sheets

SYSTEM, METHOD, AND APPARATUS FOR VOICE HANDOFFS

RELATED APPLICATIONS

This application claims priority to Application Ser. No. 60/679,936 filed Aug. 16, 2005 by Govindarajan, et. al. The foregoing is incorporated herein by reference for all purposes.

BACKGROUND OF THE INVENTION

Wireless radio technology provides both cellular service and wireless local area networks. Cellular service provides both mobile telephone and data services, including Internet access. Wireless local area networks (wi-fi) have traditionally provided data services, as well. The development of the transfer of voice data over a packet-based network, such as the internet, allows voice communications. This is known as Voice over IP (VOIP), which has been used as a substitute for telephone service.

A user can use a modern wireless handset to access both cellular service and wi-fi, if they are available. The availability of each of these services depends on the location of the user and the radio coverage for each of these services at the user's location. When both are accessible, the user has a choice. The user can choose between the wi-fi and cellular service for both data services and between cellular phone service or VOIP.

The handsets scan for both cellular service and wi-fi signals. When the handset is out of range for either service, the handset may continue to scan for a signal, or stop scanning for the out of range signal. Continuing to scan for a signal consumes the battery of the handset.

By not scanning, the handset misses opportunities when the signal becomes available. For example, a user may travel through a hole in the radio coverage of either the cellular or wi-fi service. If when the handset loses the signal, the handset stops scanning, the handset will miss the signal when the user exits the hole.

This circumstance is aggravated when there is a communication attempt initiated by another party, such as an incoming phone call, or request for a chat communication. If the handset is not scanning for either the cellular service, or the wi-fi service, the incoming phone call/request for a chat communication is not received. If the handset is accessing one of the services, for example the cellular service, the handset receives the communication attempt via the cellular service. This can occur, even where the wi-fi service is available. However, handset does not take advantage of this choice.

BRIEF SUMMARY OF THE INVENTION

A power management system is described where the handset can enter sleep or hibernation mode for a particular service, when the particular service is either not used or not available. The handset is capable of using the service, even in response to a non-user initiated incoming request for communication. The handset receives the request over the active service. The handset can then check for the availability of the inactive service, activate it, and a selection can be made between them.

DETAILED DESCRIPTION OF THE INVENTION

Figure 1:
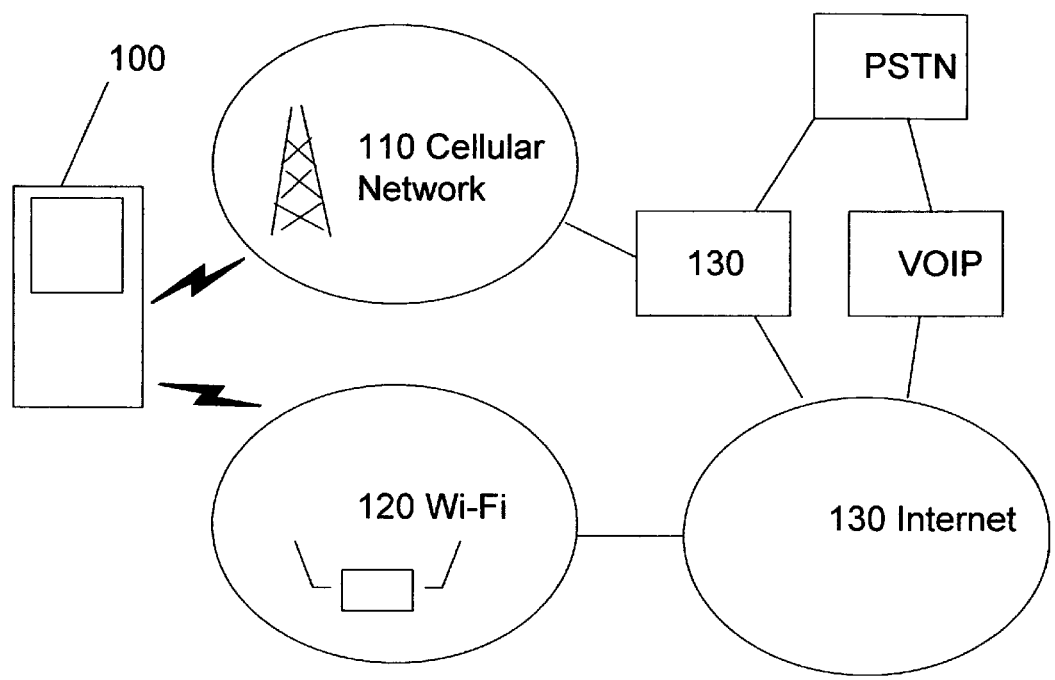
FIG. 1 is a diagram of the service options for the handset.

FIG. 1 is a diagram of converged networks providing service for handset 100. The handset 100 has access to both a cellular network 110 and a wi-fi network 120. The cellular network 110 provides both cellular telephone and data services, such as Internet access and short message services (SMS) to the handset 100. The cellular network 110 is generally, but does not have to be, a public land mobile network (PLMN), for example, according to GSM/GPRS (Global System for Mobile Communications and General Packet Radio Services).

The cellular network 110 provides access to the public switched telephone network (PSTN), allowing the handset to call and be called by another telephone. The cellular network 110 also provides access to the internet. The handset 100 can then access web servers, conduct chat sessions, and send email using the Internet. The cellular network 110 also includes a provider server 130. The provider server 130 can be a computer that is linkable to a network.

The wi-fi network 120 also provides access to the Internet as well as other data services. The wi-fi network 120 is generally a more localized network, as compared to the cellular network. For example, the wi-fi network 120 can cover a corporate campus or the like, and also provide access to the company computer network.

The handset 100 can be a laptop, a palm pilot, a PDA, a blackberry, mobile phone or the like that can wirelessly access the cellular network 110 and the wi-fi network 120. The handset 100 includes receivers for receiving the radio signals from both the cellular network 110 and the wi-fi network 120. The receivers scan for signals from the cellular network 110 and the wi-fi network 120.

Figure 2:
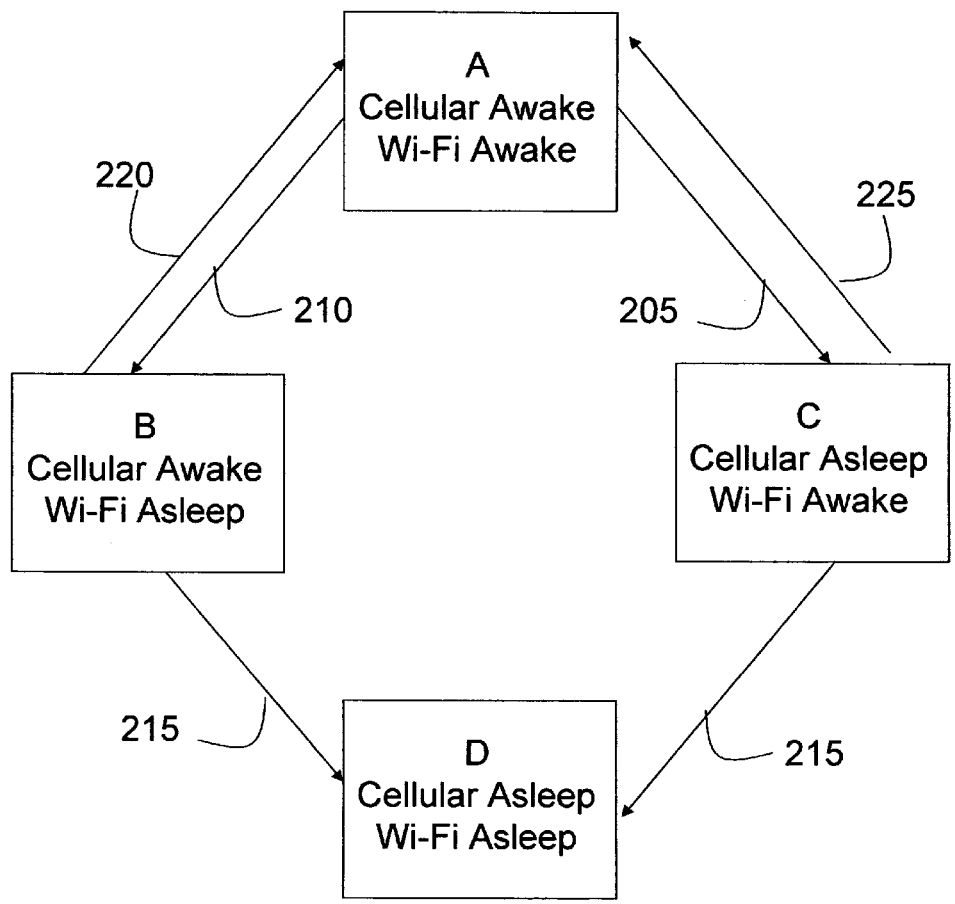
FIG. 2 is a state diagram describing the power states of the handset.

When the handset 100 is out of range for either service, the handset powers down in a manner that maintains its readiness to wake up. This preserves battery power and saves energy. The handset 100 can be in four different power states:

a. Cellular Awake/Wi-fi Awake
  b. Cellular Awake/Wi-fi Asleep
  c. Cellular Asleep/Wi-fi Awake
  d. Cellular Asleep/Wi-fi Asleep FIG. 2 is a state diagram describing the power states of the handset. In state a, the handset 100 scans for signals from both the cellular network 110 and the wi-fi network 120. For a variety of reasons, the signals that the handset 100 receives may fade. For example, the handset 100 may move to an area where the signal from either of the networks is weak or non-existent.

If the signals from cellular network 110 or wi-fi network 120 fades to less than some threshold signal strength, the cellular network 110 is no longer accessible by the handset 100. After a period of time, the handset 100 stops scanning for a signal from the cellular network 110 or wi-fi network 120. When the handset 100 stops scanning for the signal from the cellular network 110, the handset 100 enters state c (arrow 205). When the handset 100 stops scanning for the signal from the wi-fi network 120, the handset enters state b (arrow 210). From states b and c, where the handset 100 stops scanning for the signal from the other network 110, or 120, the handset 100 enters state d (arrow 215). In state d, the handset 100 polls the services at regular time intervals. Although the handset 100 stops scanning in states b, c, and d, the handset 100 is ready to resume both cellular 110 and wi-fi services 120 where such services are available. The existence of certain conditions cause the handset 100 to check for the availability of a particular service. Where the particular service is found, the handset 100 changes states.

Figure 3:
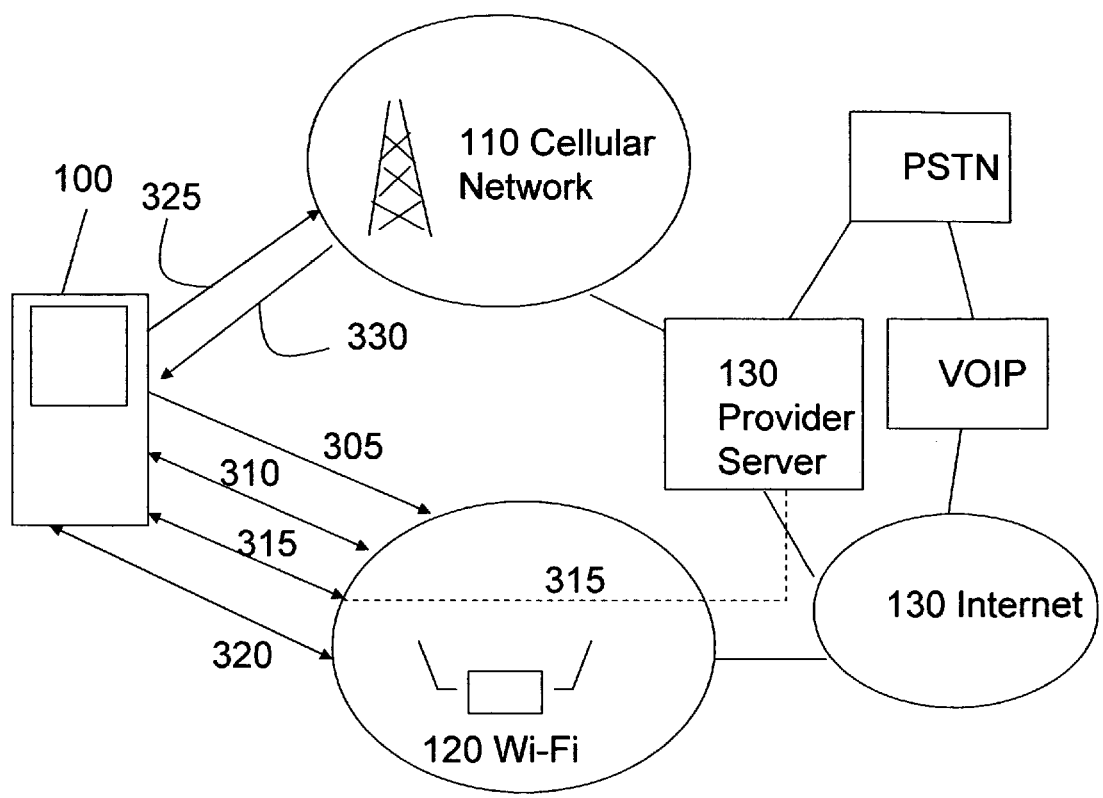
FIG. 3 describes the signaling for emerging from the cellular on/wi-fi off state to the cellular on/wi-fi on state.

FIG. 3 is a signal diagram for emerging from the cellular on/wi-fi off state to the cellular on/wi-fi on state as shown in FIG. 2, arrow 220. The handset 100 maintains access to the cellular services 110, but does not scan for signals from the wi-fi service 120.

The handset 100 checks for the availability of the wi-fi service 120 responsive to a variety of conditions. Some of the conditions may be user-initiated. Examples of user-initiated conditions are placement of an outbound call, initiation of a chat request, accessing a web page, or sending an email. When one of these conditions occur, the handset 100 polls (arrow 305) for a wi-fi signal.

If the wi-fi signal is available, the handset 100 establishes a wi-fi connection (arrow 310). Upon establishing the wi-fi connection, the handset 100 transmits a signal (arrow 315) that informs the provider server 130 of its access to wi-fi services 120 over the wi-fi network. The signal provides information, such as the handset 100 IP address, and other information, such as user preferences, signal strength of the wi-fi, and the amount of battery power for the handset 100.

If the wi-fi signal is available, the handset 100 compares the cellular service 110 to the wi-fi service 120 according to certain metrics. These metrics include (but are not limited to):
   a. Costs—the cost of each of the services. The cheaper service is preferred.
   b. Power Consumption—the amount of power consumed by each service. The less power hungry service is preferred.
   c. Quality of Services—how suitable the service is for the communication.
   d. Signal Strength—the strength of the signal received.
   e. User Preferences Based on the comparison of a combination of these metrics, the handset 100 selects between the cellular service 110 and the wi-fi service 120. For the data services, such as chat request, web page access, or sending an email, the handset 100 can use either the cellular service 110 (arrow 320) or the wi-fi service 120 (arrow 325) to access the Internet. For the outgoing call, the handset 100 can either use the wi-fi service for VOIP, or the cellular service 110.

The handset 100 also checks for the availability of the wi-fi services 120 in response to non-user initiated events. These events can include, for example, an incoming phone call, email, or chat request. The provider server 130 receives the incoming communication, and routes the communication through the cellular network 110 to the handset 100. The cellular network 110 transmits a control signal (arrow 330) to the handset 100.

The handset 100 polls the wi-fi network 120 (arrow 305) to determine if wi-fi services are available. If the wi-fi services 120 are available, the handset 100 registers with the wi-fi services 120. Additionally, the handset 100 sends a signal (arrow 315) over the wi-fi network 120 to the provider server 130, informing the provider server 130 of its IP address, and other information.

The handset 100 or provider server 130 compares the cellular service 110 and the wi-fi service 120 according to the aforementioned metrics and selects either the cellular network 110 or the wi-fi service 120 and selects one. If the handset 100 selects the service, the handset 100 sends a selection signal (arrow 315) to the provider server 130. The provider server 130 can route the communication through the cellular network 110 (signal 325) or the wi-fi network 120 (signal 320).

Figure 4:
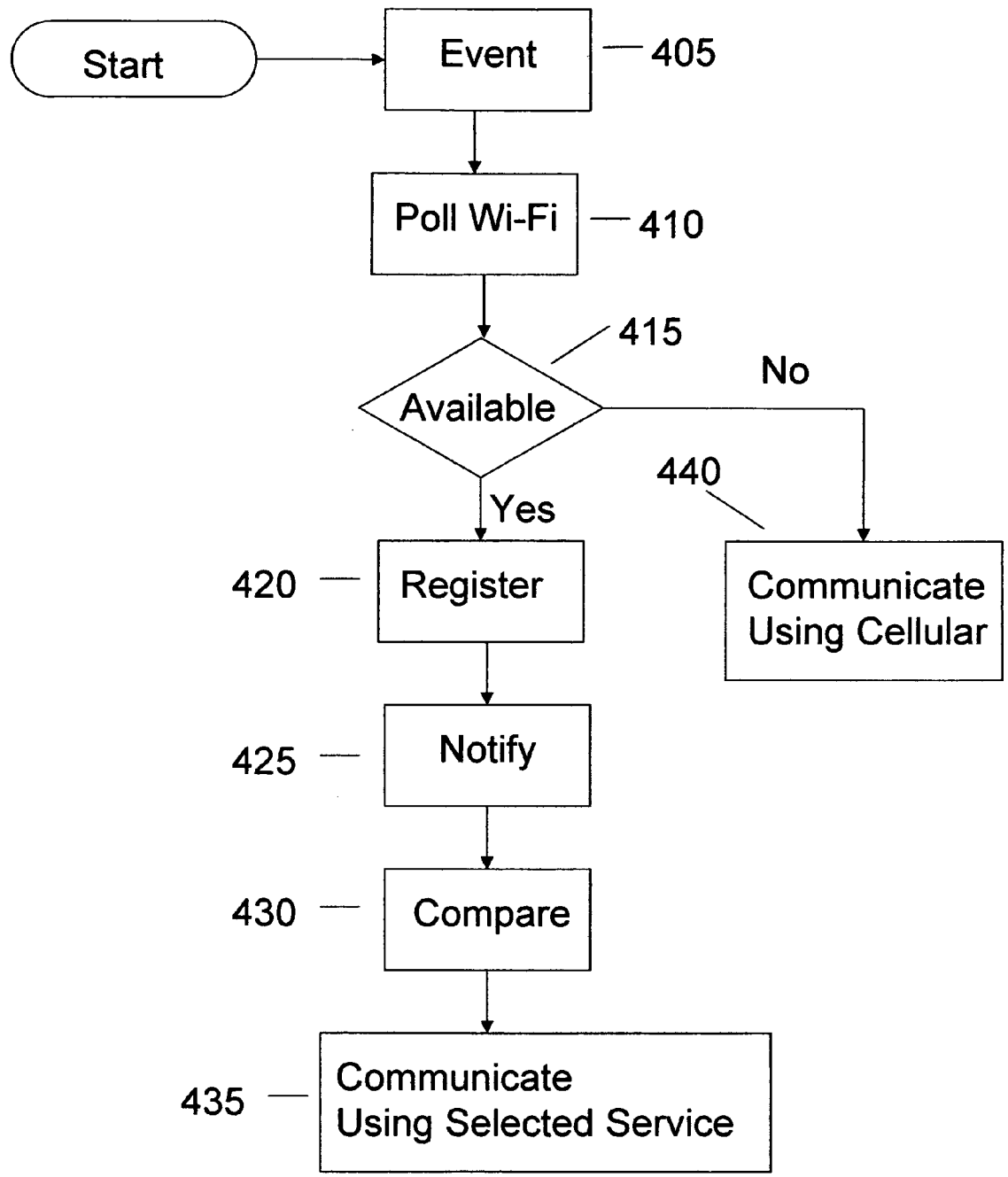
FIG. 4 is a flow diagram for emerging from the cellular on/wi-fi off state to the cellular on/wi-fi on state by the handset.

Referring now to FIG. 4, there is illustrated a flow diagram for emerging from the cellular on/wi-off state to the cellular on/wi-fi on state by the handset 100. At 405, an event occurs at the handset 100. The event can either be receiving a command for a user-initiated action, or receiving a notification of a non-user initiated communication. Upon the occurrence of the event, at 410 the handset 100 polls the wi-fi service 120. If at 415, the wi-fi service is available, the handset 100 registers with the wi-fi service at 420, notifies the provider server 130 at 425, and compares the cellular service 110 to the wi-fi service 120 according to the certain metrics at 430. At 435, the handset 100 communicates using the selected service. If at 415, the wi-fi service is unavailable, the handset communicates using the cellular service 110 at 440.

Figure 5:
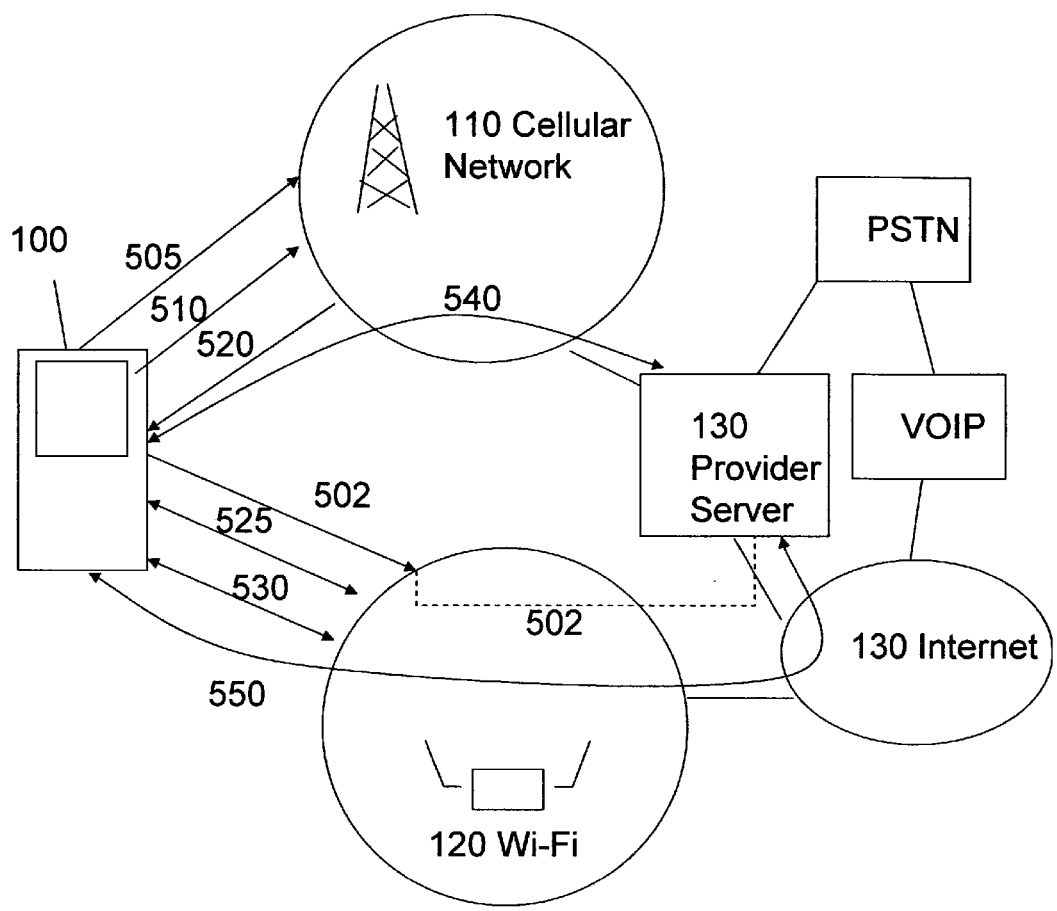
FIG. 5 describes the signaling for emerging from the cellular off/wi-fi on to the cellular on/wi-fi on state.

FIG. 5 is a signal diagram for emerging from the cellular off/wi-fi on state to the cellular on/wi-fi on state as shown in FIG. 2, arrow 230. The handset 100 maintains access to the wi-fi services 120, but does not scan for signals from the cellular services 110. When the handset 100 accesses the wi-fi services 120, the handset 100 sends a notification (502) to the provider server 130. The notification 502 includes the IP address for the handset 100, and other information, such as user preferences, signal strength of the wi-fi, and the amount of battery power for the handset 100.

The handset 100 checks for the availability of the cellular service 110 responsive to a variety of conditions. Some of the conditions may be user-initiated. Examples of user-initiated conditions are placement of an outbound call, initiation of a chat request, accessing a web page, or sending an email. When one of these conditions occur, the handset 100 polls (arrow 505) for a cellular signal.

If the cellular signal is available, the handset 100 establishes a connection (arrow 510) with the cellular network 110. If the cellular signal is available, the handset 100 compares the cellular service 110 to the wi-fi service 120 according to certain metrics.

Based on the comparison of a combination of these metrics, the handset 100 selects between the cellular service 110 and the wi-fi service 120. For the data services, such as chat request, web page access, or sending an email, the handset 100 can use either the cellular service 110 (arrow 520) or the wi-fi service 120 (arrow 525) to access the Internet. For an outgoing call, the handset 100 can either use the wi-fi service 120 for VOIP, or the cellular service 110.

The handset 100 also checks for the availability of the cellular services 110 in response to non-user initiated events. These events can include, for example, an incoming phone call, email, or chat request. The provider server 130 receives the incoming communication, and routes the communication through the wi-fi network 120 to the handset 100. As noted above, the provider server 130 is aware of the handset 100 IP address from signal 502. The wi-fi network 120 transmits a control signal (arrow 530) to the handset 100, informing the handset 100 of the incoming communication.

The handset 100 polls the cellular network 110 (arrow 505) to determine if cellular services 110 are available. If the cellular services 110 are available, the handset 100 registers with the cellular services 110. The provider server 130 compares the cellular service 110 and the wi-fi service 120, using the information provided to it from signal 502, according to the metrics and selects either the cellular network 110 or the wi-fi service 120. Alternatively, the handset 100 makes the comparison and selection, and informs the provider server. The provider server 130 can route the communication through the cellular network 110 (arrow 540) or the wi-fi network 120 (arrow 550).

Figure 6:
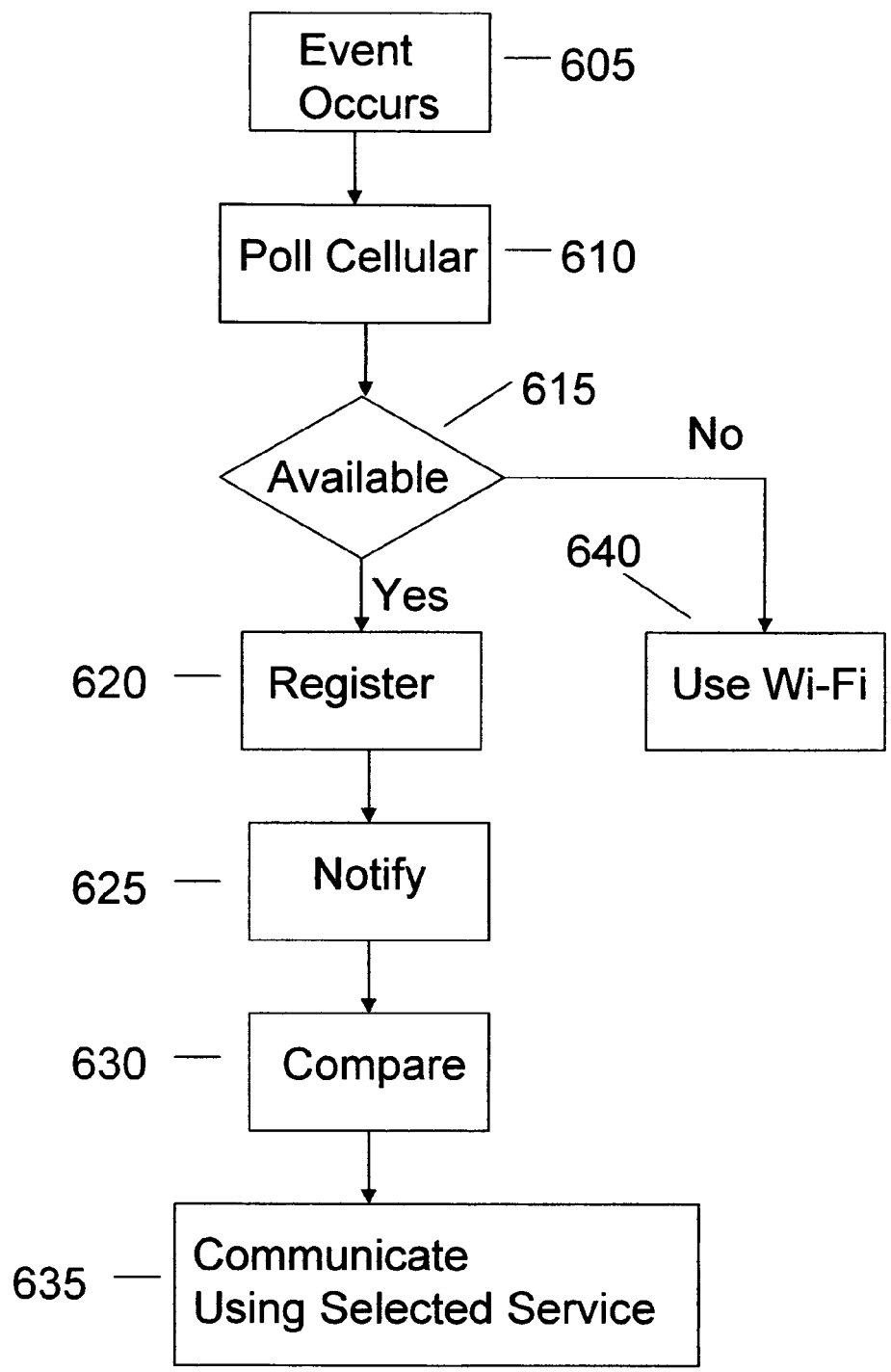
FIG. 6 is a flow diagram for emerging from the cellular off/wi-fi on to the cellular on/wi-fi on state by the handset.

Referring now to FIG. 6, there is illustrated a flow diagram for emerging from the cellular on/wi-off state to the cellular on/wi-fi on state by the handset 100. At 605, an event occurs at the handset 100. The event can either be receiving a command for a user-initiated action, or receiving a notification of a non-user initiated communication. Upon the occurrence of the event, at 610 the handset 100 polls the cellular service 110. If at 615, the cellular service 110 is available, the handset 100 registers with the cellular service at 620, notifies the provider server 130 at 625, and compares the cellular service 110 to the wi-fi service 120 according to the certain metrics at 630. At 635, the handset 100 communicates using the selected service. If at 615, the cellular service 110 is not available, the handset 100 communicates using the wi-fi service at 640.

Figure 7:
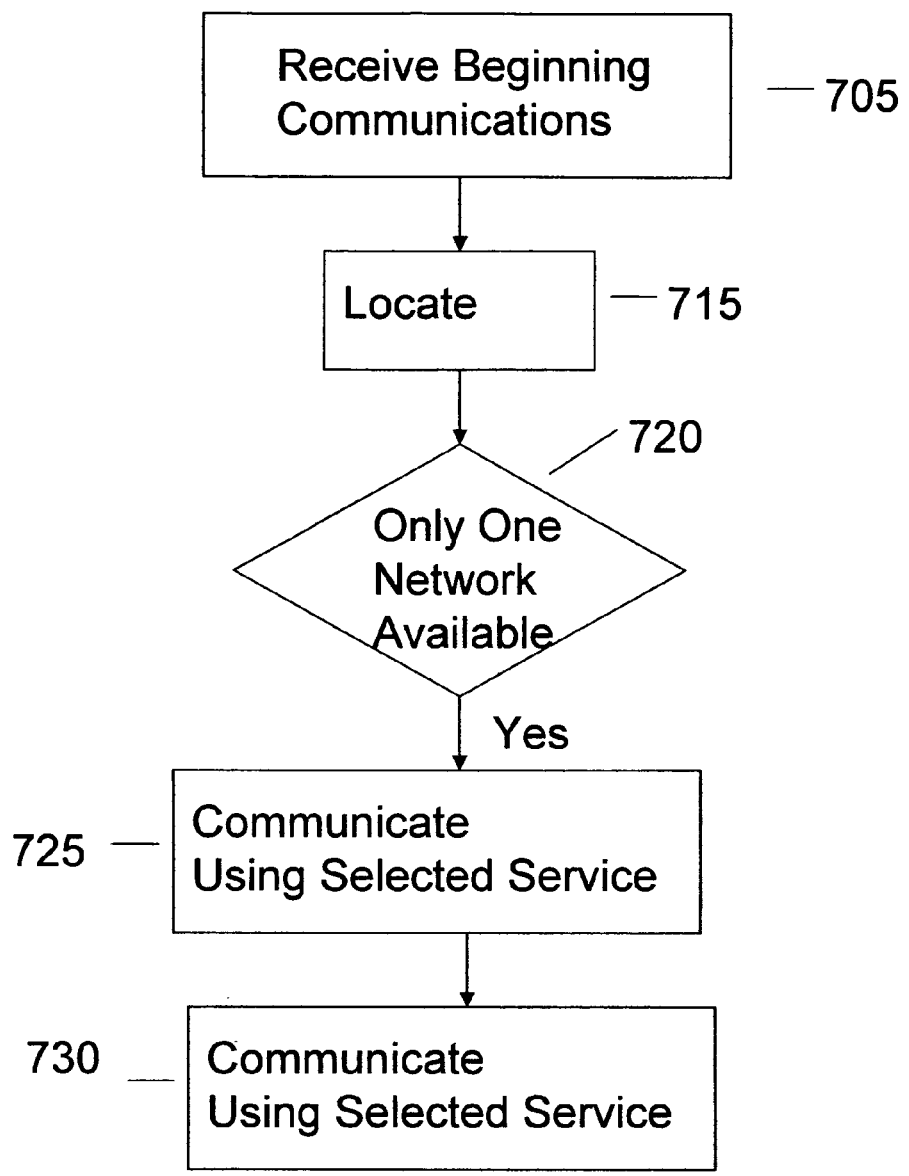
FIG. 7 is a flow diagram for the provider server.

Referring now to FIG. 7, there is illustrated a flow diagram for the provider server 130. At 705, the provider server 130 receives an incoming communication request. At 710, the provider server 130 attempts to locate the handset 100 in both the cellular network 110 and the wi-fi network 120.

If the handset 100 at 715 is only available in one of the networks, the provider server 130 notifies the handset 100 in the available network of the incoming request for communication. At 720 the provider server 130 receives a notification from the handset 100 indicating whether the handset 100 was able to establish connection with the other network, and if so, its location in the other network. At 725, the provider 130 receives a signal from the handset 100 indicating the preferred network. At 730, the provider server 130 sends the incoming request for communication to the handset 100 over the selected network.

Figure 8:
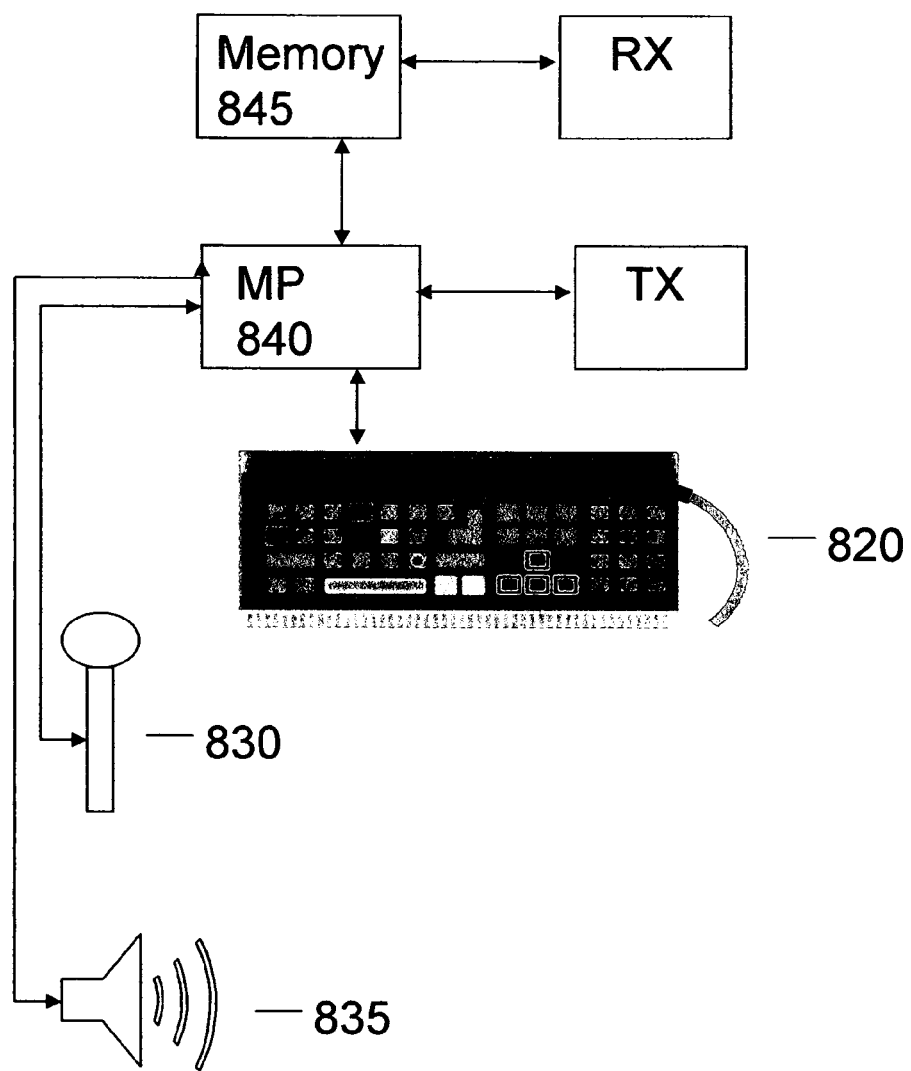
FIG. 8 is a block diagram for the handset.

FIG. 8 is a block diagram of the handset 100. The handset 100 includes receiver(s) Rx for receiving radio signals from the cellular service 110 and the wi-fi service 120, transmitter(s) Tx for transmitting radio signals to the cellular service 110 and the wi-fi service 120, a keyboard 825, a microphone 830, speaker 835, processor 840, a memory 845, a screen 847, and a battery 850. The memory 845 can store software that is run by the processor 840 that controls the handset 100 as has been described.

The foregoing section and figures describe the present invention by way of example. The present invention is not limited by the foregoing examples. Although cellular and wi-fi services are used as examples, other services can also be used. The examples can be modified in a variety of ways without departing from the scope of the present invention. Therefore, the present invention includes all embodiments falling within the scope of the following claims.

The invention claimed is:

1. A method for selecting a communication service, said method comprising:
   receiving, at a communication handset, a request for an inbound or outbound communication while the communication handset is registered with one type of communication service but is not scanning for a second type of communication service;
   in response to receiving the request while the communication handset is not scanning for the second type of communication service, determining, at the communication handset, if the second type of communication service is available;
   switching a component on the communication handset from an asleep state to an awake state in response to the request for an inbound or outbound communication, the component used in determining if the second type of communication service is available;
   registering the communication handset with the second type of communication service;
   comparing metrics of the one type of communication service with metrics of the second type of communication service;
   selecting between the one type of communication service and the second type of communication service based upon the comparison of the metrics; and
   responding to the request using the selected type of service.

2. The method of claim 1, wherein the request is a user initiated request.

3. The method of claim 1, wherein the request is received at the communication handset over a network corresponding to the one type of communication service.

4. The method of claim 1, wherein the comparing metrics of the one type of communication service with the metrics of the second type of communication service includes comparing one of costs of the types of communication services, power consumption of the types of communication services, quality of the types of communication services, and signal strength of the types of communication services.

5. The method of claim 1, wherein one or more components on the communication handset used for the second type of communication service is in an asleep state when the request is received and one or more components on the communication handset used for the first type of communication service in an awake state when the request is received.

6. The method of claim 1, wherein the request for an inbound or outbound communication is selected from the group consisting of a call request, a chat request, a request for access to a web page, and a request to send or receive an email.

7. The method of claim 1, wherein one of the one type of communication service and the second type of communication service is cellular service and the other of the one type of communication service and the second type of communication service is wifi service.

8. Software stored in memory such that when executed by a processor is operable to:
   receive, at a communication handset, a request for an inbound or outbound communication while the communication handset is registered with one type of communication service but is not scanning for a second type of communication service;
   in response to receiving the request while the communication handset is not scanning for the second type of communication service, determine, at the communication handset, if the second type of communication service is available;
   switching a component on the communication handset from an asleep state to an awake state in response to the request for an inbound or outbound communication, the component used in determining if the second type of communication service is available;

register the communication handset with the second type of communication service;

compare metrics of the one type of communication service with metrics of the second type of communication service;

select between the one type of communication service and the second type of communication service based upon the comparison of the metrics;

respond to the request using the selected type of service.

9. The software of claim 8, wherein the request is a user initiated request.

10. The software of claim 8, wherein the request is received at the communication handset over a network corresponding to the one type of communication service.

11. The software of claim 8, wherein the comparing metrics of the one type of communication service with the metrics of the second type of communication service includes comparing one of costs of the types of communication services, power consumption of the types of communication services, quality of the types of communication services, and signal strength of the types of communication services.

12. The software of claim 8, wherein one or more components on the communication handset used for the second type of communication service is in an asleep state when the request is received and one or more components on the communication handset used for the first type of communication service in an awake state when the request is received.

13. The software of claim 8, wherein the request for an inbound or outbound communication is selected from the group consisting of a call request, a chat request, a request for access to a web page, and a request to send or receive an email.

14. The software of claim 8, wherein one of the one type of communication service and the second type of communication service is cellular service and the other of the one type of communication service and the second type of communication service is wifi service.

15. A communication handset comprising software embodied on a non-transitory computer-readable medium, the software, when executed by a processor, operable to:

scan for signals received by a communications handset from a first and a second type of communications network;

determine that the first type of communications network is not accessible by the communications handset, the determining comprising comparing the signal strength of signals received from the first type of communications network to a threshold signal strength;

conserve power consumption of the communications handset by preventing the communications handset from automatically scanning for signals from the first type of communications network after determining the signal strength of the first type of communications network is below the threshold signal strength;

after preventing the communications handset from automatically scanning for signals from the first type of communications network, determine whether communications using the first type of communications network is available in response to an event on the communications handset, the event comprising:

receiving a signal from the second type of communications network; and an attempt by the user of the communications handset to communicate using the first type of communications network;

switch a component on the communication handset from an asleep state to an awake state in response to the event on the communications handset, the component used in determining whether communications using the first type of communications network is available;

after determining the first type of communications network is available, compare metrics of the first type of communication network with metrics of the second type of communication network; and select between the first type of communication network and the second type of communication network based upon the comparison of the metrics.

16. The communication handset of claim 15, wherein the event comprises:

an outbound phone call;
a initiation of a chat request;
an attempt to access a web page;
an attempt to send an email message;
an incoming phone call;
an incoming email message; and
an incoming chat request.

17. The communication handset of claim 15, wherein the first type of communications network is a cellular network, and second type of communications network is a wi-fi network.

18. The communication handset of claim 15, wherein the first type of communications network is a wi-fi network, and second type of communications network is a cellular network.

* * * * *